May 27, 1958 P. A. KENNEBECK 2,836,823

WAVE GUIDE TRANSMITTING ANTENNA

Filed Dec. 19, 1952 3 Sheets-Sheet 1

INVENTOR.

P. A. Kennebeck

By Arthur H. Sturges
Attorney

INVENTOR.
P. A. Kennebeck
By Arthur H. Sturges
Attorney.

May 27, 1958 P. A. KENNEBECK 2,836,823

WAVE GUIDE TRANSMITTING ANTENNA

Filed Dec. 19, 1952 3 Sheets-Sheet 3

INVENTOR.
P. A. Kennebeck
BY Arthur H. Sturges
Attorney.

United States Patent Office 2,836,823

Patented May 27, 1958

2,836,823

WAVE GUIDE TRANSMITTING ANTENNA

Paul A. Kennebeck, Grand Prairie, Tex.

Application December 19, 1952, Serial No. 326,884

13 Claims. (Cl. 343—782)

This invention relates to the transmission of radio, television, and other electrically actuated signal communication and the like, and in particular a transmitting antenna system of high gain, and that will transmit a pattern of wave fronts with good phase relation between them whereby the resultant signals received by a receiving apparatus will be stronger, with higher fidelity, and will be less subject to fading than signals of conventional transmitting apparatus.

The purpose of this invention is to provide an improved radio and television signal transmitting apparatus wherein wave fronts are formed which will generate strong following wave trains making it possible to transmit greater distances with less relay stations, and with stronger signals, minimum distortion and less fading.

This system of transmission is generally referred to as "high gain" or "high antenna gain" as the insulated polarized radiating element is positioned between parallel wave guides whereby signals being emitted therefrom follow a narrow channel and consequently, the signals received are stronger and a gain in signal transmission is accomplished.

Radio and television signals that actuate or energize most receiving antennas are not the direct linear wave fronts that are propagated from a transmitting antenna. They are, however, secondary wave trains that are generated by the originally propagated wave fronts from the transmitting antenna.

The stronger the original linear polarized wave fronts are the stronger the secondary wave trains that are generated in several directions will be. Thus a stronger signal from secondary wave trains will be received with higher fidelity and at greater distances than heretofore if the original linear polarized wave fronts are transmitted in multiple array and with greater antenna gain than heretofore.

With this thought in mind this invention contemplates a housing having an open front with a radiating element positioned in and insulated from the housing and with the radiating element connected by a conductor through supporting means of the housing to conventional transmitting apparatus of a station.

It is an object of this invention, therefore, to provide a device for transmitting electrical signals in polarized array with phase relation between transmitting or radiating elements in a preselected direction and in a comparatively restricted pattern in such a manner that the signals are transmitted in beams to radio relay receiving apparatus or television relay system remotely disposed from the source of origin of the signals and in a more efficient manner than has been possible heretofore.

Another object of the invention is to provide an electrical signal transmitting device having a radiating element housed within wave guides wherein a plurality of said devices are adapted to be positioned in vertically disposed relation on a supporting element and the spacing between the devices may be such that efficient phase relationship is provided between the devices for a transmission pattern of polarized wave fronts for transmission of signals of modulated wave forms from such devices to a remotely disposed signal receiving apparatus or relay station, whereby the transmitted signals are concentrated in several polarized wave fronts in a comparatively narrow channel in a fixed direction and wherein a high antenna gain is obtained.

In a radio or television transmitter where signals are transmitted at frequencies of from one to ten thousand megacycles or higher, the spaced apart distances between wave impulses is comparatively small, and yet a complete battery of transmitting elements occupies an appreciable amount of space. Owing to the fact that space is often valuable and sometimes not available the improved transmitter of this invention includes a battery of radiating elements the impulses from which are beamed or channeled in a selected direction and in such a manner that the transmitting elements thereof occupy comparatively little space whereby it is possible to use a comparatively large number of channels of communication and also to reduce the cost of the installations, particularly when the transmitter is used in conjunction with the Narrow Beam Receiving Antenna of my prior Patent No. 2,615,120.

Another object of the invention is to provide improved transmitting apparatus for local television broadcasting antenna systems with a directional field of any selected part of a 360° azimuth depending upon the broadcasting pattern desired, and whereby the radiated wave fronts transmitted are restricted to narrow wave channels and concentrated to cause stronger following wave trains for television reception at greater distances than heretofore possible.

A further object of this invention is to provide a transmitter that is particularly adapted for use in connection with the mechanism disclosed in my above-noted prior patent.

In accordance with the present practice in radio relay transmitting systems the signal is caused to lose strength within the wave guide and further loss results from the means used to focus the radiation whether the focusing means be a reflector or a metallic lens apparatus.

The conventional television radiating elements used on local broadcasting antenna towers are disposed in various positions with respect to vertically disposed supporting poles, masts or towers, and the radiating elements usually have metallic perimeters of various design, such as square, loop, cloverleaf and the like whereby electrical impulses emitted from radiating elements spread outwardly from the elements in all directions. As an example, the inner face of the perimeter radiates impulses across the center of the perimeter toward the opposite side thereby resulting in great waste of signal strength.

The most important object of this system is, therefore, to provide a transmitting antenna system of high gain, and that will transmit a pattern of wave fronts in good phase relation between them whereby the resultant signals received at a receiving apparatus will be strong, with high fidelity and in which their tendency to fading will be reduced.

With these and other objects and advantages in view the invention embodies vertically spaced parallel horizontally disposed upper and lower plates, with radiating elements positioned between the plates and insulated therefrom, and with the radiating elements connected to a conventional transmitting apparatus in a station by coaxial cables or other conductors.

Other features and advantages of the invention will appear from the following description taken in connection with the drawings, wherein.

Figure 1:
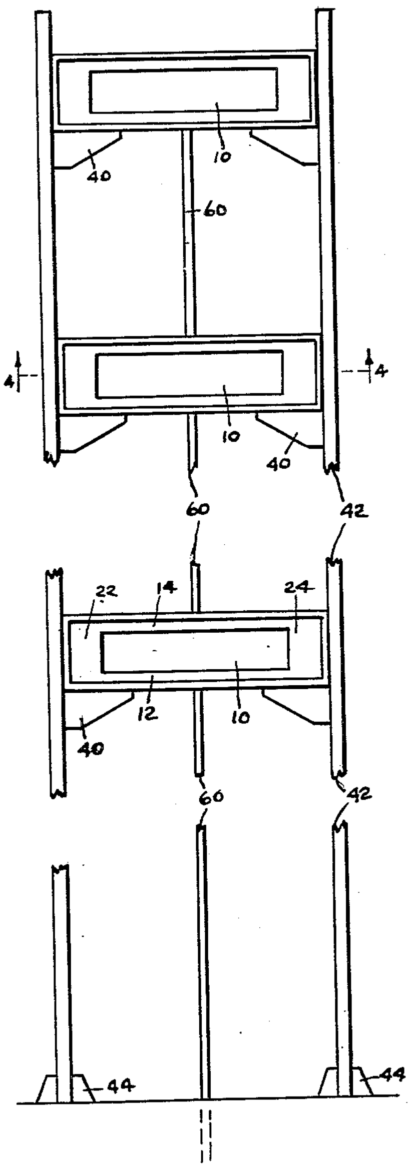
Figure 1 is a front elevational view of a transmission tower showing a plurality of vertically spaced radiating elements in open front housings thereon and with parts of the tower structure broken away.

Referring now to the drawings wherein like reference characters denote corresponding parts, the improved high gain polarized transmitting antenna of this invention includes a radiating element 10 position in a lining of insulating material having a lower section 12, an upper section 14, a rear wall 16, end walls 18 and 20, and flanges 22 and 24 extended inwardly at the front from the end walls and providing an open area or mouth 26, and the lining with the radiating element therein is positioned in a housing having a base 28, a cover 30, a rear wall 32, and end walls 34 and 36.

Figure 2:
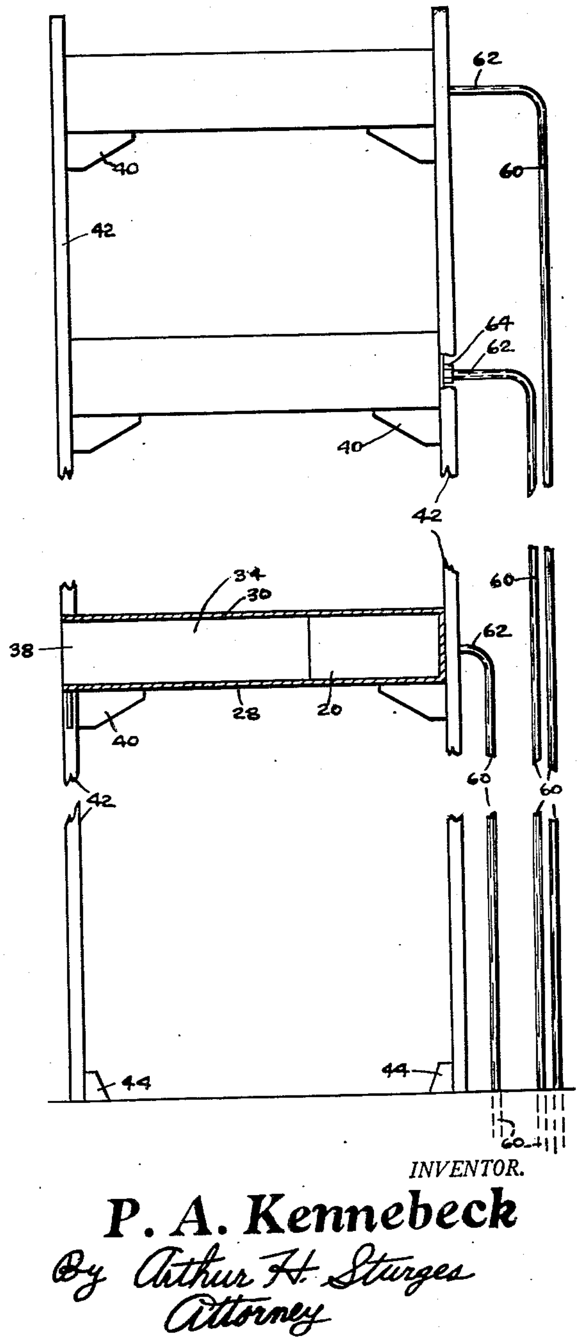
Figure 2 is a side elevational view of the tower shown in Figure 1 with the housing of one of the radiating elements broken away and shown in section, and also with parts of the tower structure broken away.

The housing is provided with an open front 38 that is aligned with the open area or mouth 26 of the insulation around the radiating element 10. These units are supported in vertically spaced relation in a mast or frame, such as the structure shown in Figures 1 and 2 wherein the units are secured by gusset plates 40 to posts 42, and the posts are held laterally by braces 44 or by other suitable means. The frame or tower may be installed on the roof of a building or positioned on a suitable foundation, and the individual units may be vertically spaced in the tower or supporting structure to provide the most efficient phase relations between the transmitting elements.

The radiating element 10 is illustrated as being of a rectangular shape, and it will be understood that this element is formed of a size and shape, and also of material such as copper, iron, or alloys or other similar conducting metals, to provide the most efficient propagation of wave fronts, the material having the proper electrical properties of resistance, conductivity, reactance and capacity to conform to the wave length or frequency being transmitted.

Figure 3:
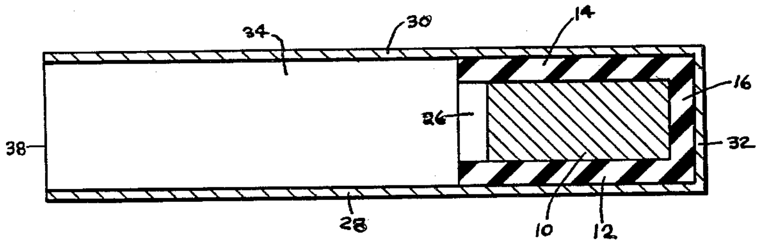
Figure 3 is a longitudinal section through one of the transmitting devices taken on line 3—3 of Figure 4, showing a housing with a radiating element therein and insulated therefrom.
Figure 4:
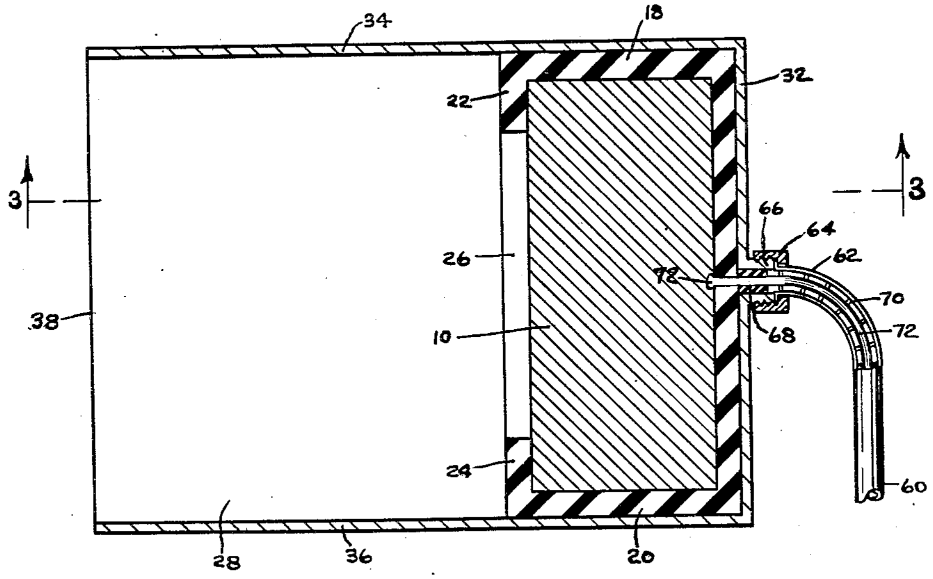
Figure 4 is a sectional plan through one of the transmitters showing the connection of a coaxial cable to the radiating element of the transmitter, said section taken on line 4—4 of Figure 1.

As shown in Figures 3 and 4 the radiating element 10 abuts the side edges or flanges 22 and 24 of the mouth 26, and does not extend into the mouth. The flanges 22 and 24 are provided to reduce an undesirable phenomenon known as "end effect," and it will be understood that these flanges could be omitted and still have a fair resultant.

The radiating elements 10 are in electrical communication with conventional transmitting apparatus of a station in combination with which the devices of this invention are used by means of conductors and preferably said conductors are the coaxial cables 60 the terminal ends 62 of which are secured by couplings 64 to threaded nipples 66 which extend from the rear wall 32 of the housing. The nipples are lined with insulating sleeves 68 and the cables with insulating blocks 70 through which a conductor wire 72 extends, as shown in Figure 4. The conductor wire 72 extends through the rear wall 16 of the insulating lining of the housing and the end thereof is secured to the radiating element 10 of each of the units.

In operation and assuming that a signal from a transmitter is carried through a cable, such as the cable 60, to the radiating element 10, and that the frequency of the repetitious signals is of the order of 4000 megacycles, the signal or electrical impulse is broadcast in a direction complemental to the longitudinal axis of the housing whereby said signals are emitted in a comparatively narrow channel through the mouth of the wave or signal guide.

A first wave is emitted through said mouth and this is followed by succeeding waves, the spacing or distance between the waves being in accordance with the frequency used. As the signal impulses are confined to a narrow channel instead of being disbursed in all directions, or disturbed by the focusing means, as in the prior practice, they are, therefore, stronger when received by a remotely disposed relay station or other receiving apparatus.

With a plurality of units similar to the above-noted unit and operating in the same manner, positioned below said unit, and with said units operating as a battery, such as with three or more units, a polarized beamed signal is communicated to a receiver at a remotely situated point with proportionately improved reception, particularly in instances where the receiver is constructed in accordance with the Narrow Beam Receiving Antenna of my prior Patent No. 2,615,126.

The horn or funnel-shaped apparatus used by most conventional transmitting stations at present is provided with a square or rectangular-shaped mouth which is approximately ten or twelve feet square, and the walls converge toward a wave guide which is connected thereto. The mouth of such a device is provided with, what is known as, a metallic focusing lens, whereby the waves emitted therethrough are channeled in a beam, the cross sectional area of which is substantially equivalent to the size of the mouth, whereas the concentrated and directed channel of the transmitter of this invention is comparatively small and has a higher antenna gain than the horn or funnel-shaped devices.

A greater number of batteries of the transmitters of this invention may, therefore, be installed in a given area than is possible with the horn or funnel-shaped devices and radio, television, telegraph, or telephone signals may be transmitted at a comparatively low cost.

Figure 5:
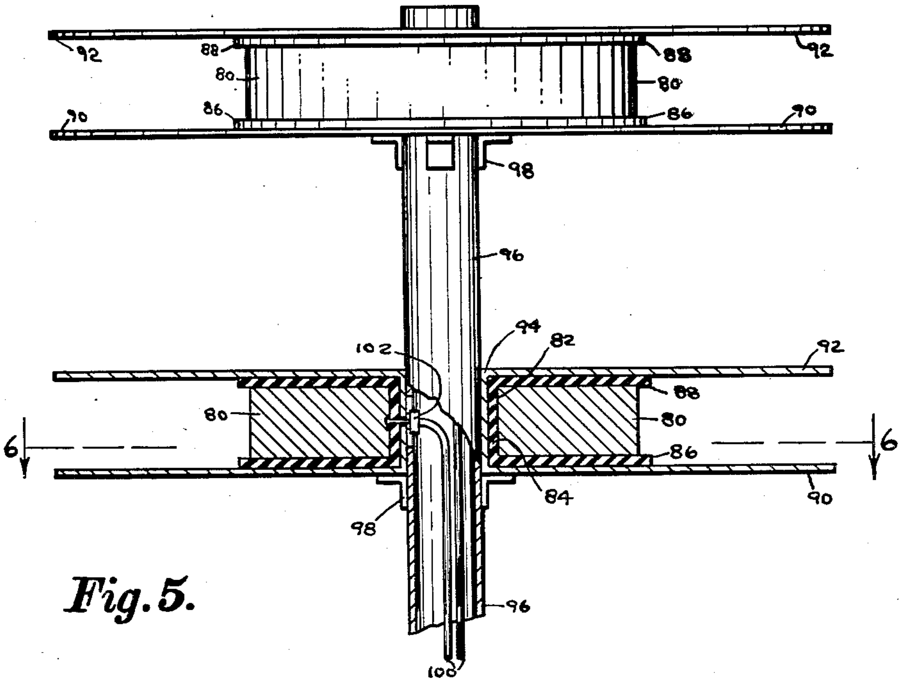
Figure 5 is an elevational view illustrating a modification wherein a circular radiating element is positioned between and insulated from spaced discs, and showing two of said transmitters on a pole or mast, one of said transmitters being broken away and shown in section.
Figure 6:
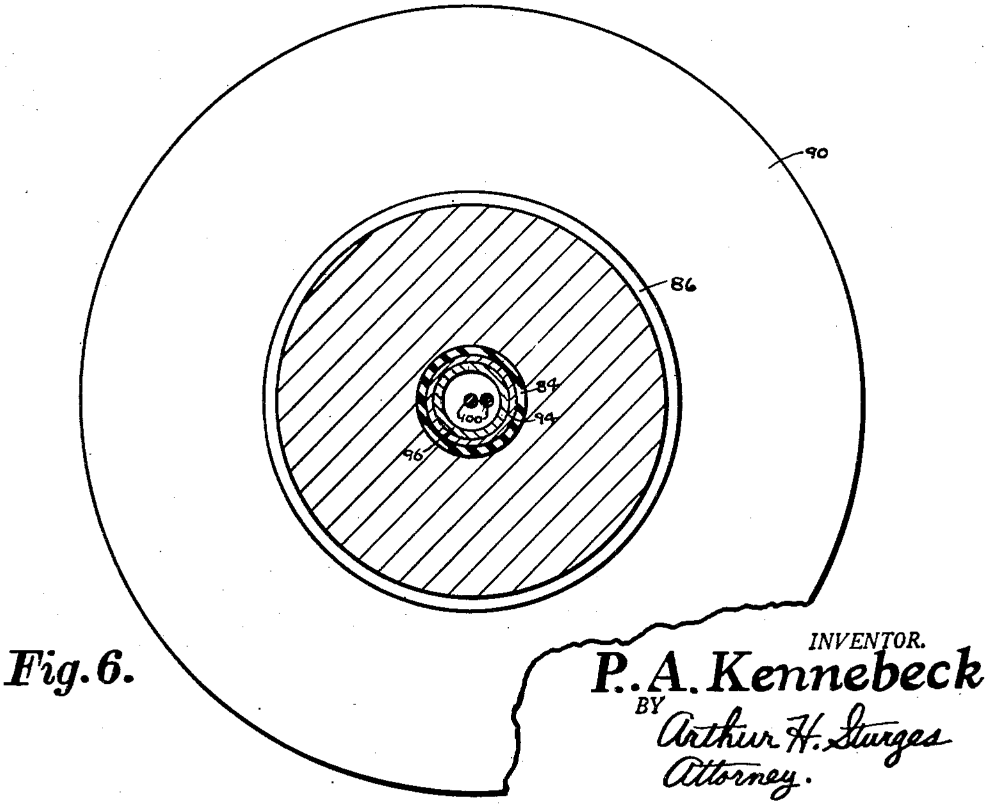
Figure 6 is a sectional plan taken on line 6—6 of Figure 5 also showing the modified form of the transmitter.

In the design illustrated in Figures 5 and 6 a cylindrical radiating element 80 with a centrally positioned opening 82 therein is positioned in a spool having a core 84 with annular flanges 86 and 88 and the spool which is formed of insulating material, is positioned between wave guides or discs 90 and 92, the discs being connected at the center with a sleeve 94. The complete unit is supported on a tubular mast or post 96 with clip angles 98, and the radiating element is connected by a conductor or coaxial cable 100 to a conventional transmitter of a station, such as a local broadcasting station, with the coaxial cable or conductor 100 for each unit positioned on a mast extended through the mast, as shown in Figure 5.

The coaxial cables 100 are brought through openings in the mast 96, sleeves 94 of the said discs or wave guides and cores 84 of the insulating spools to the radiating elements 80 to which they are connected. This unit is particularly adapted for local broadcasting service.

The unit illustrated in Figures 5 and 6, in lieu of emitting channel signals, as described in relation to the unit shown in Figures 1 through 4, emits signals in a horizontal direction and in part or in all directions, such as 360° or in a circle, or an azimuth of 360° or less, depending upon the broadcast pattern desired as the radiating element is annular or partly annular, as desired.

The units shown in Figures 5 and 6 operate exactly the same as the units of Figures 1 through 4, when used for local television broadcasting, except that the units of Figures 5 and 6 concentrate signals in horizontal planes whereby wave fronts are formed which will generate much stronger following wave trains which makes reception of television signals by receivers at greater distances than have been accomplished heretofore possible.

With the units of Figures 1 through 4 relay stations may be positioned at greater distances apart and also from the original source than has been possible heretofore, the signals being of greater strength, having higher fidelity, and being less subject to fading, whereby the number of relay stations is reduced.

With the relay stations positioned at the same distances as stations in present practice stronger signals, and signals with minimum distortion and higher fidelity and less fading are received. With the comparatively smaller size of these transmitting units several batteries of the units may be used on the same towers or masts that are used for a single conventional unit thereby making it possible to provide more channels than are used at present, and also channels at a lower cost per channel.

From the foregoing description it is thought to be obvious that a high gain polarized transmitting Antenna constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

What is claimed is:

1. An antenna comprising a radiating element, spaced wave guides between which the radiating element is positioned, and insulating material filling the space between the radiating element and wave guides for insulating said radiating element from the wave guides on four sides and also on the back thereof, there being no insulation on the front of said radiating element.

2. A high gain polarized transmitting antenna comprising a radiating element, an insulating unit extended above, below, at the sides and back and thereby substantially covering the surface of said radiating element, the face of said element being exposed, and a housing having spaced wave guides between which said radiating element with the insulating unit thereon is positioned.

3. A high gain polarized transmitting antenna comprising a solid element of material having electric conductivity providing a radiating element, insulating material covering upper, lower, and end surfaces, and also the back of said radiating element, the face of said element being exposed, and a housing having spaced parallel plates positioned above and below said radiating element and also covering the side of the element on which the insulating material is positioned, said plates of the housing extended beyond the radiating element providing wave guides, and said radiating element being insulated from the housing by said insulating material.

4. In a high gain polarized transmitting antenna, the combination which comprises a rectangular-shaped block of material having electrical conductivity, a rectangular-shaped housing in one end of which said block of material is positioned, the end of the housing opposite to the end in which said block of material is positioned being open, and a lining of insulating material positioned on the four sides and back of said block, and between the housing and block of material.

5. In a high gain polarized transmitting antenna, the combination which comprises a rectangular-shaped block of material having electrical conductivity providing a radiating element, a rectangular shaped housing having a base, a cover, a rear wall and side walls, said radiating element being positioned in the housing and adjacent to the rear wall thereof and the opposite open end of the housing being extended beyond said radiating element, and a lining of insulating material positioned between and filling the area between the radiating element and housing on the four sides and back thereof, the front of the radiating element being exposed.

6. In a high gain polarized transmitting antenna, the combination which comprises a rectangular shaped radiating element, a rectangular-shaped housing having a closed end and an open end, said radiating element being positioned in the closed end of the housing, a lining of insulating material positioned between the sides, ends, and back of the radiating element and corresponding parts of the housing, the front of the radiating element being exposed, and a conductor extended from said radiating element through the insulating material and housing, said insulating material extending over the edges of the radiating element on the side facing the open end of the housing.

7. An antenna comprising a cylindrical radiating element, said radiating element having a bore, a spool of insulating material having circular flanges connected with a tubular core, said radiating element being positioned on said spool, and spaced discs positioned against the flanges of the spool and extended beyond the radiating element providing wave guides.

8. A high gain polarized transmitting antenna comprising a cylindrical radiating element having a bore, a housing including spaced discs providing wave guides and between which said radiating element is positioned, and means insulating the radiating element from the housing.

9. In a high gain polarized transmitting antenna, the combination which comprises a circular mass of material having electrical conductivity providing a radiating element, said radiating element having a bore, a housing having spaced discs positioned with the discs extended beyond the periphery of the radiating element, said housing including a sleeve connecting the discs and said sleeve extending through the bore of the radiating element, a lining of insulating material positioned between the housing and radiating element, and a conductor extended from said radiating element.

10. In a high gain polarized transmitting antenna, the combination which comprises a radiating element, a housing having spaced parallel plates between which said radiating element is positioned, said plates extending beyond the outer edge of said radiating element, panels of insulating material on the sides, upper and lower surfaces, and back of the radiating element for insulating the radiating element from the housing, the front of the radiating element being exposed, and means supporting the housing with the radiating element therein with a plurality of said devices in vertically spaced relation.

11. An antenna comprising a radiating element, spaced wave guides positioned on opposite sides of the radiating element, and layers of insulating material positioned on the sides, upper and lower surfaces, and back of the radiating element, and between the guides and radiating element, the front of the radiating element being exposed.

12. An antenna comprising a radiating element, layers of insulating material extended over all surfaces of said radiating element except one providing an open face, and spaced parallel wave guides positioned against the insulating material on the four sides of said radiating element.

13. An antenna comprising a solid element of material having electrical conductivity providing a radiating element, insulation on the top, bottom, sides, and back of said radiating element, no insulation being provided on part of the front thereof, a conductor connected to said radiating element and extended through the insulation at the back thereof, said conductor being adapted to be connected to a transmission line, and a housing including parallel plates and sides providing a directional wave guide and in which the radiating element and insulation are positioned.

References Cited in the file of this patent

UNITED STATES PATENTS

| | | |
|---|---|---|
| 2,142,138 | Llewellyn | Jan. 3, 1939 |
| 2,255,042 | Barrow | Sept. 9, 1941 |
| 2,311,364 | Buschbeck et al. | Feb. 16, 1943 |
| 2,425,585 | Wheeler | Aug. 12, 1947 |
| 2,441,615 | Brown | May 18, 1948 |
| 2,565,506 | Litchford | Aug. 28, 1951 |
| 2,698,901 | Wilkes | Jan. 4, 1955 |

FOREIGN PATENTS

| | | |
|---|---|---|
| 831,419 | Germany | Feb. 14, 1952 |